United States Patent
Itakura (10) Patent No.: US 9,772,247 B2
(45) Date of Patent: Sep. 26, 2017

(54) PRESSURE SENSOR

(71) Applicant: DENSO CORPORATION, Kariya, Aichi-pref. (JP)

(72) Inventor: Toshikazu Itakura, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 15/304,098

(22) PCT Filed: May 12, 2015

(86) PCT No.: PCT/JP2015/002410
§ 371 (c)(1),
(2) Date: Oct. 14, 2016

(87) PCT Pub. No.: WO2015/174081
PCT Pub. Date: Nov. 19, 2015

(65) Prior Publication Data
US 2017/0045408 A1    Feb. 16, 2017

(30) Foreign Application Priority Data
May 14, 2014  (JP) ................. 2014-100127

(51) Int. Cl.
*G01L 7/00*        (2006.01)
*G01L 19/14*       (2006.01)
*G01L 9/00*        (2006.01)

(52) U.S. Cl.
CPC ............ *G01L 19/14* (2013.01); *G01L 9/0054* (2013.01); *G01L 19/144* (2013.01)

(58) Field of Classification Search
CPC ...... G01L 19/14; G01L 9/0054; G01L 19/144
USPC ............................. 73/755, 700, 754; 29/854
See application file for complete search history.

(56) References Cited

U.S. PATENT DOCUMENTS

| | | | |
|---|---|---|---|
| 4,937,936 A * | 7/1990 | Schill | H01R 13/7197 29/854 |
| 6,553,841 B1 * | 4/2003 | Blouch | G01L 21/12 73/700 |
| 6,601,452 B2 * | 8/2003 | Murata | B81B 3/0075 73/700 |
| 7,380,458 B1 | 6/2008 | Date et al. | |
| 2009/0038399 A1 | 2/2009 | Watanabe | |

FOREIGN PATENT DOCUMENTS

| | | |
|---|---|---|
| JP | 2010-210498 A | 9/2010 |
| JP | 2011-073570 A | 4/2011 |

* cited by examiner

*Primary Examiner* — Jewel V Thompson
(74) *Attorney, Agent, or Firm* — Posz Law Group, PLC (57) ABSTRACT

A pressure sensor includes a sensor chip that detects a pressure of a pressure medium; and a case that accommodates the sensor chip and has an inlet port connected with the outside, the case having a pressure inlet portion surrounding the inlet port. The pressure inlet portion is configured from: a front wall placed forward of the case with a clearance; a top wall and a pair of side walls, each which is connected to the front wall; and an opening introducing the pressure medium into the inlet port from a lower position with respect to the inlet port. The top wall is connected to the side walls and angled in entirety toward an upper position with respect to the inlet port. The front wall has an opening end configuring the opening, the opening end being recessed toward the top wall in an arc shape.

7 Claims, 6 Drawing Sheets

PRESSURE SENSOR

CROSS-REFERENCE TO RELATED APPLICATIONS

The present application is a U.S. national stage application of International Patent Application No. PCT/JP2015/002410 filed on May 12, 2015 and is based on Japanese Patent Application No. 2014-100127 filed on May 14, 2014, the disclosure of which is incorporated herein by reference.

TECHNICAL FIELD

The present disclosure relates to a pressure sensor used in a waterlogged environment.

BACKGROUND

A conventional type of pressure sensors having structures that prevent entry of foreign materials has been proposed in, for example, Patent Literature 1. Specifically, a structure has been proposed that includes a pressure detection element placed in a case having a port through which a pressure medium is guided to the pressure detection element.

The port protrudes from the exterior wall of the case. The port has an opening that opens to the lower end of the port and a passageway introducing the pressure medium into the inside of the case through the opening. That is, the port has a structure resembling an umbrella. The upper end of the port is flat, and an opening end that defines the opening is also flat.

The inventors of the present application have found the following. The conventional technique may allow water to be collected when the upper end is exposed to water, since the upper end of the port is flat. The water may flow from the upper end along the exterior wall of the port and freeze into ice. The ice may grow into an icicle, which may block the opening of the port.

Additionally, water tends to remain at the opening end of the opening of the port since the opening end is flat, instead of flowing away from the opening end. The water remaining at the opening end may freeze into ice, which may grow into an icicle. The icicle may block the opening of the port.

PATENT LITERATURE

Patent Literature 1: U.S. Pat. No. 7,380,458 B

SUMMARY

It is an object of the present disclosure to provide a structure that minimizes the possibility of water remaining at a pressure inlet portion of a case in a pressure sensor used in a waterlogged environment.

According to one aspect of the present disclosure, a pressure sensor includes a sensor chip that detects a pressure of a pressure medium; and a case that accommodates the sensor chip and has an inlet port connected with an outside of the pressure sensor.

The case has a pressure inlet portion surrounding the inlet port, the pressure inlet portion being configured from: a front wall placed forward of the case with a clearance; a top wall and a pair of side walls, each which is connected to the front wall; and an opening introducing the pressure medium into the inlet port (33) from a lower position with respect to the inlet port.

The top wall is connected to the side walls and angled in entirety toward an upper position with respect to the inlet port so as to be projected. The front wall has an opening end configuring the opening, the opening end being recessed toward the top wall in an arc shape, causing the front wall to be angled toward the side walls.

In the pressure sensor according to the present disclosure, the top wall of the pressure inlet portion is angled; thus, when the top wall is exposed to water, this structure can facilitate the water flowing toward a side wall. Additionally, the opening end of the front wall is angled; thus, when the front wall is exposed to water, the structure can facilitate the water flowing toward the side wall. Thus, the present disclosure can minimize the possibility of water remaining at the pressure inlet portion, thereby preventing the opening from being blocked due to freezing of the water.

BRIEF DESCRIPTION OF DRAWINGS

The above and other aspects, features and advantages of the present disclosure will become more apparent from the following detailed description made with reference to the accompanying drawings. In the drawings.

DETAILED DESCRIPTION

Embodiments of the present disclosure will be described with reference to the drawings. Identical or similar components in the embodiments are designated with identical symbols in the drawings.

First Embodiment

Figure 1:
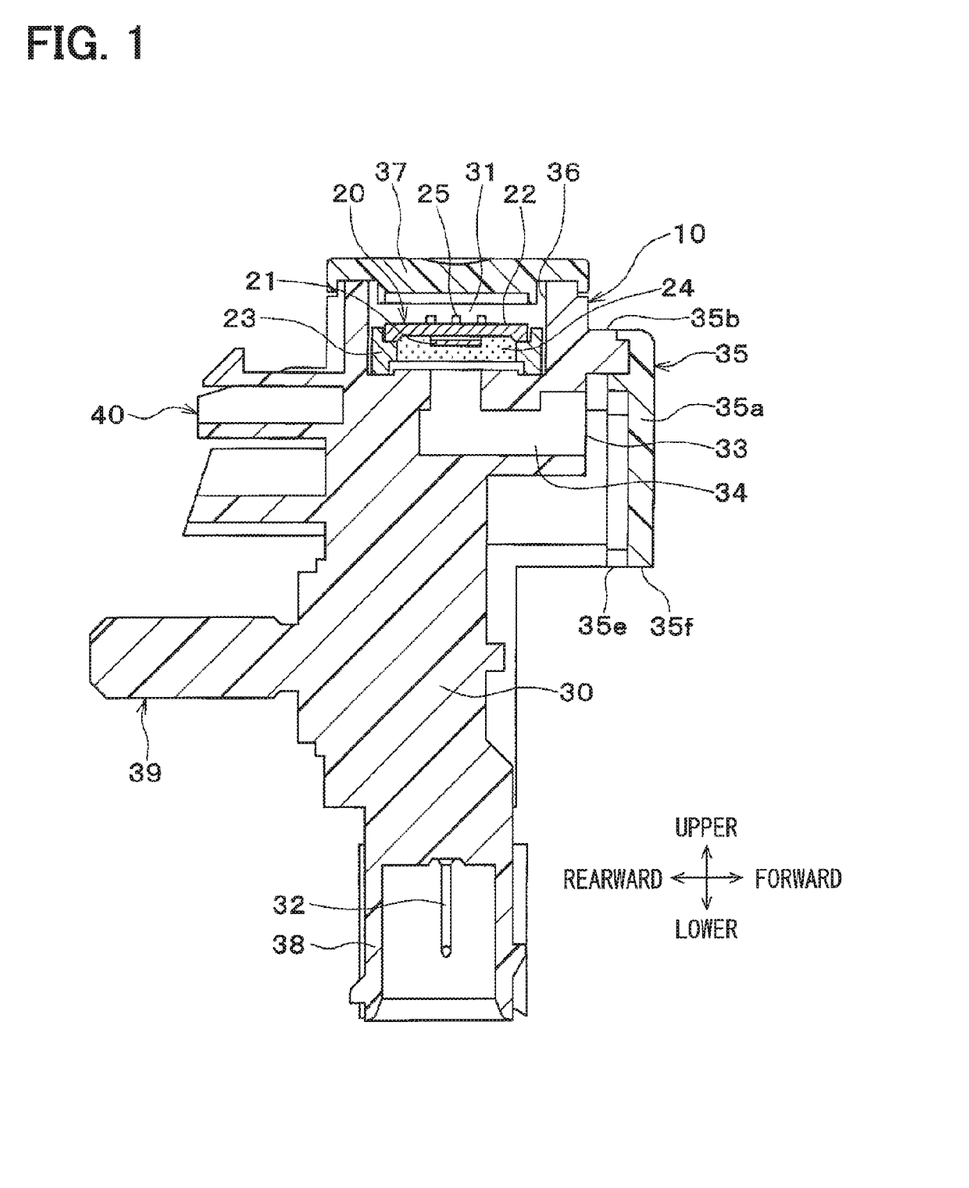
FIG. 1 is a sectional view of a pressure sensor according to a first embodiment.

A first embodiment will be described with reference to the drawings. A pressure sensor according to the present embodiment is used in a waterlogged environment. The pressure sensor is housed in a door of a vehicle and designed as a side impact detection sensor that detects a side impact into the door. The pressure sensor is secured on an inner panel placed inside the door of the vehicle. A pressure detection result by the pressure sensor is used to activate an occupant protection device, such as an airbag. A pressure sensor 10 as described above includes a pressure detection portion 20 and a case 30, as illustrated in FIG. 1.

The pressure detection portion 20 corresponds to a pressure detection means designed to detect the pressure of a pressure medium inside a door when the pressure changes in accordance with a side impact exerted on the door. The pressure detection portion 20 includes a sensor chip 21, a circuit board 22, a frame 23, and a protection material 24.

The sensor chip 21 is a semiconductor chip designed to detect the pressure of the pressure medium. The sensor chip 21 includes a semiconductor substrate having a partially reduced thickness and a diaphragm for pressure detection. The diaphragm has a pressure receiving surface, on which the pressure of the pressure medium is applied. Some gauge resistors (not shown) are arranged on the diaphragm to form a Wheatstone bridge circuit. According to this configuration, the sensor chip 21 utilizes the piezoresistance effect of each gauge resistor, and detects as a pressure a voltage based on strain on the diaphragm.

The sensor chip 21 is attached on, for example, a base, such that a vacuum pressure-reference chamber is formed in a space between the sensor chip 21 and the base. That is, the sensor chip 21 detects absolute pressure. Since the sensor chip 21 is attached on the base as described above, the base is actually secured on the circuit board 22 with, for example, an adhesive agent.

The circuit board 22 is a layered board including pads (not shown) and wiring patterns (not shown) made of Au or the like. The circuit board 22 is a ceramic multilayer board, which is a stack of ceramic boards. The circuit board 22 may be a printed circuit board. In the present embodiment, the circuit board 22 has one surface on which the sensor chip 21 is mounted and another surface on which an electronic component 25, such as a chip capacitor, is mounted.

The frame 23 is a component covering the sensor chip 21 with the protection material 24. The frame 23 is shaped into a hollow cylinder and made with a material such as resin. The frame 23 is open at both ends of the cylinder. One of the open ends of the frame 23 adjacent to the one surface of the circuit board 22 is fixed to the circuit board 22. In this manner, the sensor chip 21 is located in the hollow part of the frame 23.

The protection material 24 covers the sensor chip 21, a bonding wire (not shown), and a connection between pads (not shown) and the bonding wire for protection. The protection material 24 is disposed in the hollow part of the frame 23. Thus, the pressure of the pressure medium is applied from outside to the protection material 24 and received by the diaphragm via the protection material 24 for the detection by the sensor chip 21.

The protection material 24 may be fluorine gel, silicone gel, fluorosilicone gel, or the like. The protection material 24 can be used to prevent physical damage to the bonding wire, corrosion of the pads, and entry of foreign materials.

The case 30 corresponds to an accommodating means that accommodates the sensor chip 21, and constitutes a part of the external view of the pressure sensor. The case 30 is formed by molding resin. Specifically, the case 30 includes an accommodation chamber 31, a terminal 32, an inlet port 33, a pressure inlet path 34, and a pressure inlet portion 35.

The accommodation chamber 31 houses the pressure detection portion 20. In the present embodiment, the accommodation chamber 31, which is a hollow in the case 30, has a recess 36 formed by depressing a portion of the case 30 toward the ground. The pressure detection portion 20 is fixed to the bottom of the recess 36. The recess 36 is closed by a lid 37 to define the hollow accommodation chamber 31.

The terminal 32 is a connection part that electrically connects the sensor chip 21 to an external device. The terminal 32 is insert-molded in the case 30 such that one end of the terminal 32 is exposed in the accommodation chamber 31 and the other end of the terminal 32 is exposed in a connector portion 38 provided away from the accommodation chamber 31. For example, three terminals 32 are provided in the case 30 for power, grounding, and signal.

The inlet port 33 introduces the pressure medium to the inside of the case 30 and communicates with the pressure inlet path 34. The pressure inlet path 34 connects the inlet port 33 to the accommodation chamber 31. The pressure inlet path 34 is formed in, for example, an L-like shape.

Figure 2:
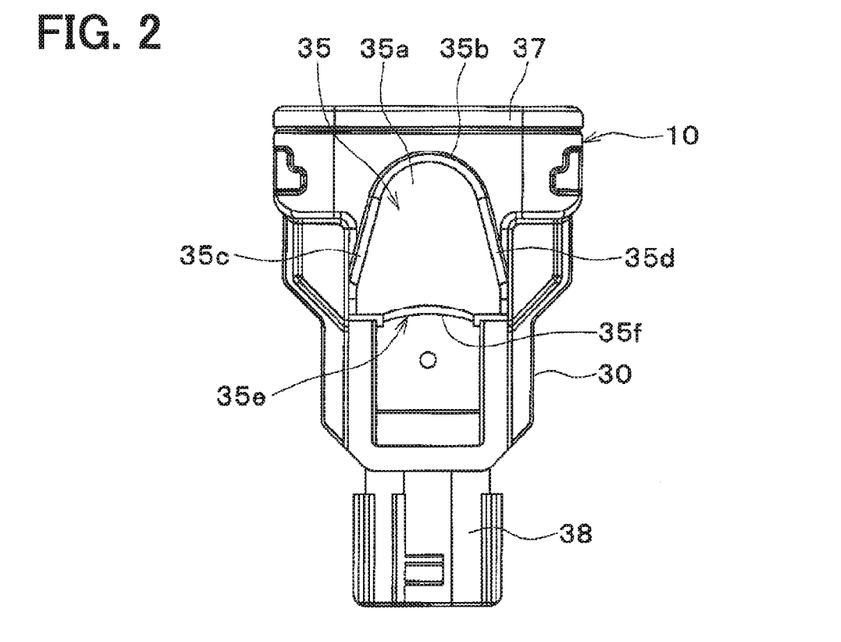
FIG. 2 is a front view of the pressure sensor according to the first embodiment.

The pressure inlet portion 35 surrounds the inlet port 33 and admits the pressure medium into the inlet port 33 from the outside. As illustrated in FIG. 2, the pressure inlet portion 35 includes a front wall 35a, a top wall 35b, and a pair of side walls 35c and 35d.

As illustrated in FIG. 1, the front wall 35a is a planar component placed forward of the case 30 with a clearance. Specifically, the front wall 35a is placed forward of the inlet port 33 so as to face the inlet port 33 with a clearance from the inlet port 33.

The top wall 35b and the side walls 35c and 35d corresponds to a wall part having a part of the case 30 protruding forward. The top wall 35b and the side walls 35c and 35d are connected to the front wall 35a. This arrangement forms an opening 35e to admit the pressure medium into the inlet port 33 from a lower position with respect to the case 30. That is, the front wall 35a, the top wall 35b, and the side walls 35c and 35d constitute an umbrella-like structure.

In the structure described above, the front wall 35a has an opening end 35f that forms the opening 35e as illustrated in FIG. 2. The opening end 35f is recessed toward the top wall 35b in an arc shape so as to be angled toward the side walls 35c and 35d. That is, the entire opening end 35f is angled, except portions where the front wall 35a is connected to the side walls 35c and 35d. In other words, the opening end 35f of the front wall 35a is not linear at a portion corresponding to a lower portion of the inlet port 33. Thus, when the front wall 35a is exposed to water, the opening end 35f of the front wall 35a, which is angled as described above, can facilitate the water flowing toward the side walls 35c and 35d.

Additionally, the top wall 35b, which is connected to the side walls 35c and 35d, is angled in its entirety so as to project toward an upper position with respect to the inlet port 33. In the present embodiment, the top wall 35b is angled in an arc shape. That is, the entire top wall 35b is angled. In other words, the top wall 35b is not flat at a portion corresponding to an upper portion of the inlet port 33. Thus, when the top wall 35b of the pressure inlet portion 35 is exposed to water, the top wall 35b, which is angled as described above, can facilitate the water flowing toward the side walls 35c and 35d.

The overall structure of the pressure sensor 10 according to the present embodiment is as described above. As illustrated in FIG. 1, the case 30 has a protruding portion 39 and a fixing portion 40 on the side opposite to the inlet port 33.

The inner panel of the door of a vehicle has through holes corresponding to the protruding portion 39 and the fixing portion 40. The protruding portion 39 and the fixing portion 40 of the case 30 are inserted into the through holes and fixed therein. With the inner panel being a reference, the opening 35e of the case 30 is located adjacent to an outer panel of the door and the case 30 is located adjacent to a cabin of the vehicle.

In the event of an impact on the door, the pressure in the space between the inner panel and the outer panel of the door changes with the impact. That is, gas present in the space between the inner panel and the outer panel of the door, which is the pressure medium, is introduced to the accommodation chamber 31 via the opening 35e, the inlet port 33, and the pressure inlet path 34 of the case 30. The sensor chip 21 then detects a pressure.

As described above, in the present embodiment, the opening end 35f of the front wall 35a forming the pressure inlet portion 35 is angled. The top wall 35b is also angled. These features can provide a structure that minimizes the possibility of water remaining at the opening end 35f of the front wall 35a and at the top wall 35b. This structure can also drain water in a fixed direction before the water freezes. Thus, the structure can minimize the possibility of blocking the opening 35e, even when water that has fallen on the pressure inlet portion 35 freezes into icicle. Hence, the structure can prevent an icicle from growing at the opening 35e of the pressure inlet portion 35.

Second Embodiment

Figure 3:
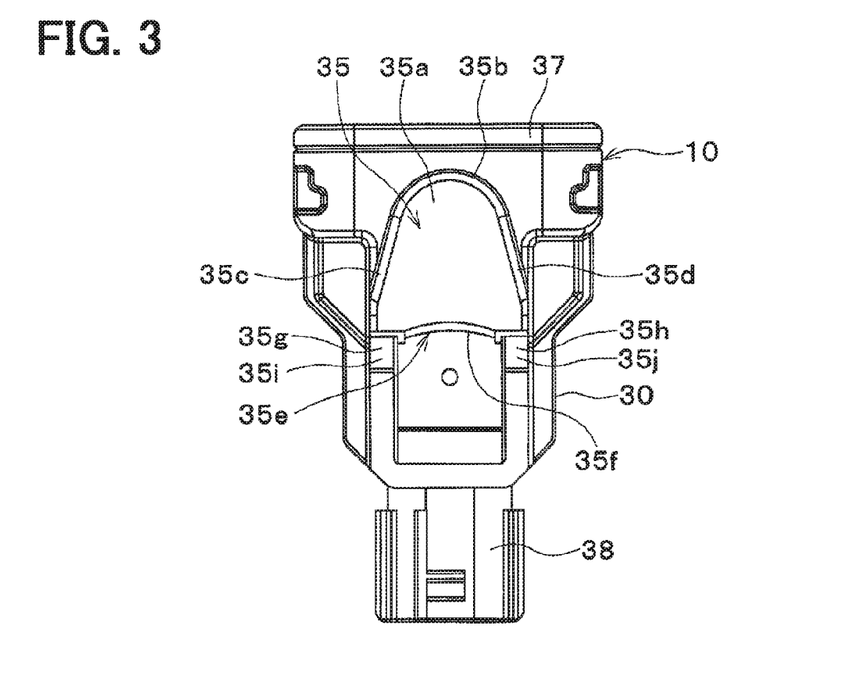
FIG. 3 is a front view of a pressure sensor according to a second embodiment.
Figure 4:
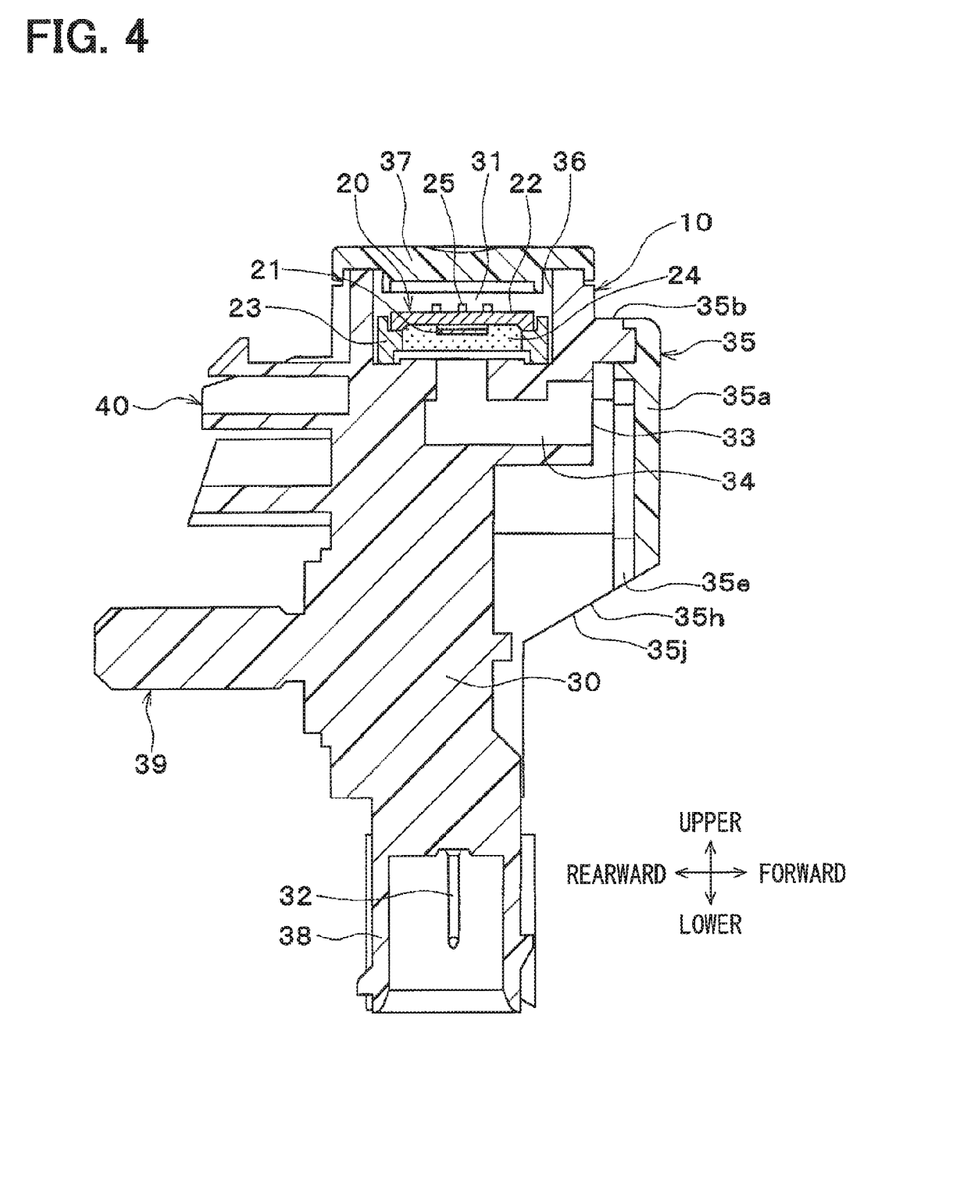
FIG. 4 is a sectional view of the pressure sensor according to the second embodiment.

Differences between the present embodiment and the first embodiment are described below. As illustrated in FIG. 3, side walls 35c and 35d have opening ends 35g and 35h, respectively. The opening ends 35g and 35h form an opening 35e of a pressure inlet portion 35. The opening ends 35g and 35h have slopes 35i and 35j, respectively. As illustrated in FIG. 4, the slopes 35i and 35j are provided in a case 30 and are angled from a front wall 35a toward an exterior wall surface of the case 30.

The opening ends 35g and 35h of the side walls 35c and 35d, which are sloped as described above, can facilitate water that has fallen on the side walls 35c and 35d flowing on the slopes 35i and 35j. Draining of the side walls 35c and 35d is improved in this manner, which can thereby prevent an icicle from growing at the opening 35e of the pressure inlet portion 35.

Third Embodiment

Figure 5:
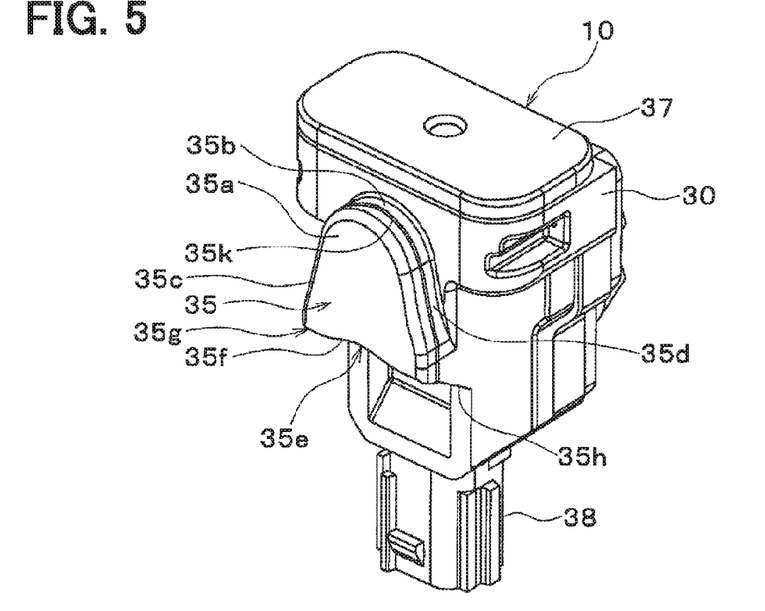
FIG. 5 is a perspective view of a pressure sensor according to a third embodiment.

Differences between the present embodiment and the first to second embodiments are described below. As illustrated in FIG. 5, a pressure inlet portion 35 has a groove 35k. Specifically, the groove 35k starts at an opening end 35g of one side wall 35c and extends in the side wall 35c, a top wall 35b, and another side wall 35d to end at an opening end 35h of the other side wall 35d; the groove 35k is formed continuously in the top wall 35b and the side walls 35c and 35d. The one side wall 35c corresponds to a first side wall; the other side wall 35d corresponds to a second side wall.

With this structure, water that has fallen on the pressure inlet portion 35 tends to enter the groove 35k due to capillarity. Hence, by the action of capillarity, water that has fallen on the top wall 35b and the side walls 35c and 35d can be caused to flow into the groove 35k. The structure can prevent an icicle from growing at an opening 35e of the pressure inlet portion 35.

Multiple grooves 35k may be formed in parallel with each other. The grooves 35k can provide improved draining.

Fourth Embodiment

Figure 6:
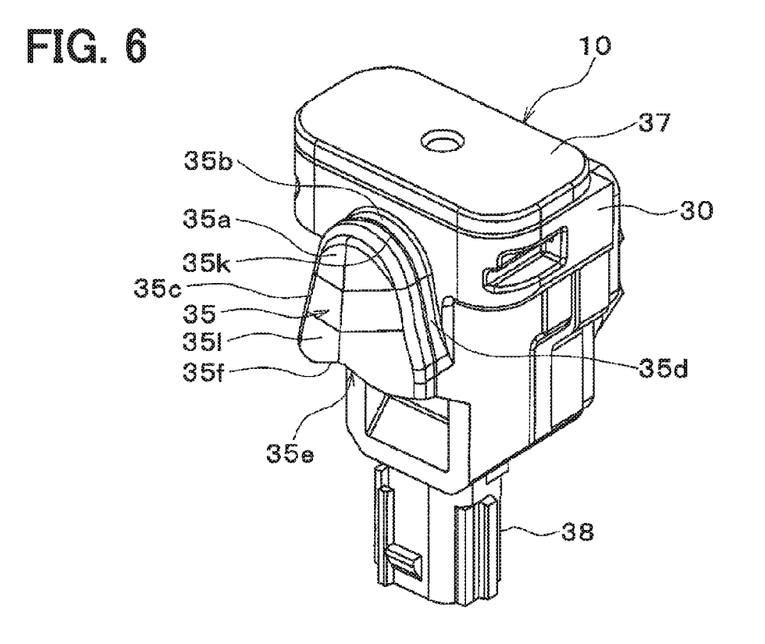
FIG. 6 is a perspective view of a pressure sensor according to a fourth embodiment.

Differences between the present embodiment and the first to third embodiments are described below. As illustrated in FIG. 6, a front wall 35a has a three-dimensional structure. Specifically, the front wall 35a has a middle portion between one side wall 35c and another side wall 35d, and the middle portion protrudes from the side walls 35c and 35d. That is, the middle portion of the front wall 35a sticks farther out than the side walls 35c and 35d. Hence, an exterior wall surface 35l of the front wall 35a is angled from the middle portion toward the side walls 35c and 35d.

Hence, water that has fallen on the front wall 35a can be drained toward the side walls 35c and 35d with increased ease. This structure can minimize the possibility of water remaining at the opening end 35f of the front wall 35a, thereby preventing an icicle from growing at an opening 35e of a pressure inlet portion 35.

Fifth Embodiment

Figure 7:
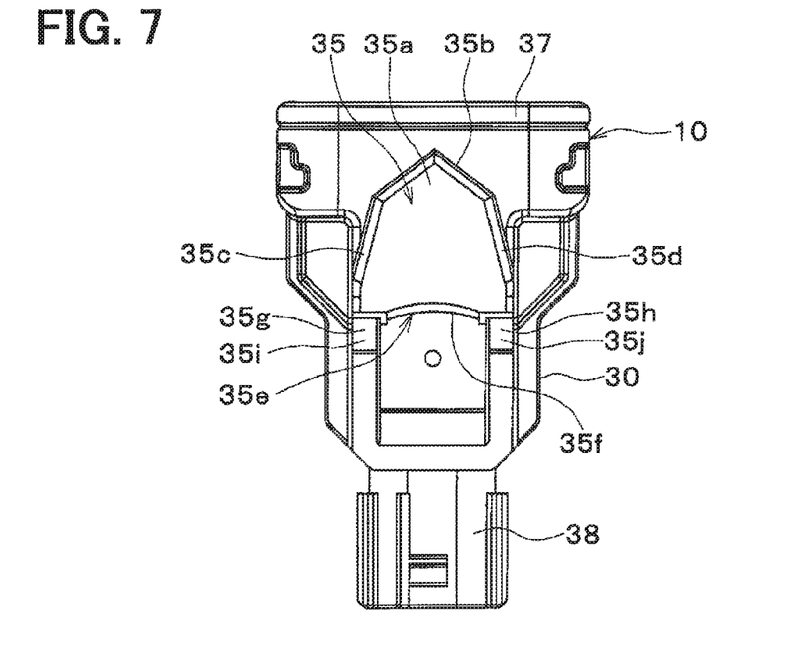
FIG. 7 is a front view of a pressure sensor according to a fifth embodiment.

Differences between the present embodiment and the first to fourth embodiments are described below. As illustrated in FIG. 7, a top wall 35b has a planar section adjacent to one side wall 35c and another planar section adjacent to another side wall 35d. The section adjacent to the one side wall 35c is connected to the section adjacent to the other side wall 35d at an acute angle. A front wall 35a has an upper portion having a triangular shape corresponding to the shape of the top wall 35b. The top wall 35b is connected to the side walls 35c and 35d at an obtuse angle.

The top wall 35b having the planar sections as described above provides angles steeper than those of a curved shape of the top wall 35b and thereby can provide improved draining for water that has fallen on the top wall 35b.

Sixth Embodiment

Figure 8:
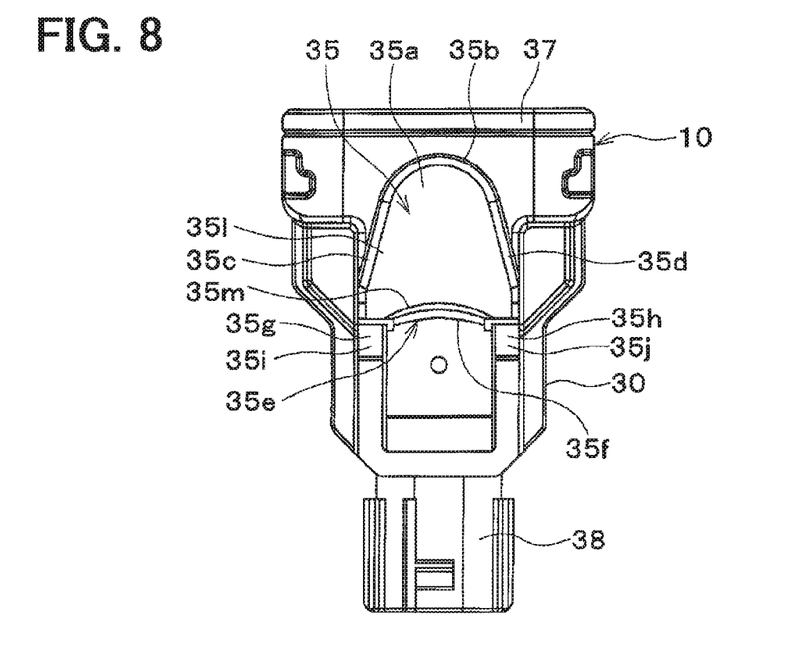
FIG. 8 is a front view of a pressure sensor according to a sixth embodiment.
Figure 9:
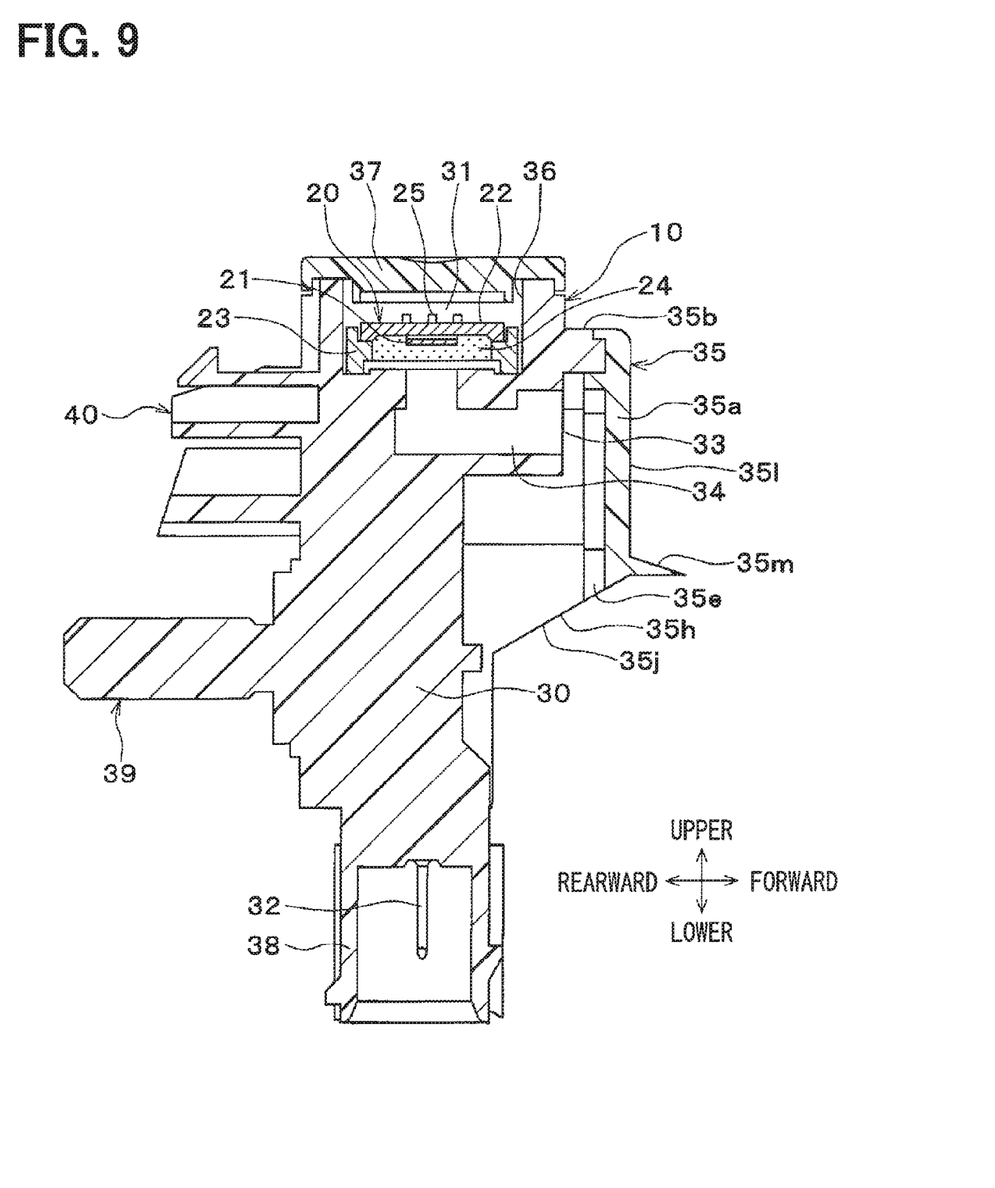
FIG. 9 is a sectional view of the pressure sensor according to the sixth embodiment.

Differences between the present embodiment and the first to fifth embodiments are described below. As illustrated in FIG. 8, a front wall 35a has a visor 35m adjacent to an opening end 35f on an exterior wall surface 35l of the front wall 35a. As illustrated in FIG. 9, the visor 35m is a protruding portion of the exterior wall surface 35l of the front wall 35a. The visor 35m is angled toward its end.

With this structure, water that has fallen on the front wall 35a flows on the exterior wall surface 35l to drop from the end of the visor 35m; thus, the structure can move the flow of the water away from an opening 35e. Hence, the structure can prevent an icicle from growing at the opening 35e of a pressure inlet portion 35.

Other Embodiments

The structures of the pressure sensor 10 in the embodiments described above are presented as examples and should not be construed as limitations. Other structures may be employed to achieve the present disclosure. For example, the structures in the embodiments described above may be combined as required.

Additionally, the locations and the like of the accommodation chamber 31, the pressure inlet path 34, and the inlet port 33 in the case 30 are presented as examples and may be changed as required. Furthermore, other factors such as the structure inside the accommodation chamber 31 and the routing of the pressure inlet path 34 may be designed as appropriate in accordance with how the pressure sensor 10 is mounted. The structure of the pressure detection portion 20 including the sensor chip 21 is of course not limited to the embodiments described above and may be changed to another structure.

In the embodiments, the term "lower," for example, indicates the direction of gravity, and the term "upper" indicates the opposite direction. The term "forward" indicates the direction perpendicular to the direction indicated by the term "lower" and toward the side on which the inlet port is located in the case.

While various embodiments, configurations, and aspects of the pressure sensor have been exemplified, the embodiments, configurations, and aspects of the pressure sensor are not limited to those described above. For example, embodiments, configurations, and aspects obtained from an appropriate combination of technical elements disclosed in different embodiments, configurations, and aspects are also included within the scope of the embodiments, configurations, and aspects of the pressure sensor.

The invention claimed is:

1. A pressure sensor comprising:
a sensor chip that detects a pressure of a pressure medium; and
a case that accommodates the sensor chip and has an inlet port connected with an outside, the case further having a pressure inlet portion surrounding the inlet port, wherein:
the pressure inlet portion is configured from:
a front wall placed forward of the case with a clearance;
a top wall and a pair of side walls, each which is connected to the front wall; and
an opening introducing the pressure medium into the inlet port from a lower position with respect to the inlet port;
the top wall is connected to the side walls and angled in entirety toward an upper position with respect to the inlet port so as to be projected; and
the front wall has an opening end configuring the opening, the opening end being recessed toward the top wall in an arc shape, causing the front wall to be angled toward the side walls.

2. The pressure sensor according to claim 1, wherein:
each of the side walls has an opening end configuring the opening; and
each of the opening ends has a slope angled from the front wall toward the case.

3. The pressure sensor according to claim 1, wherein:
the top wall and the side walls have a groove;
the side walls include a first side wall and a second side wall; and
the groove connects from an opening end of the first side wall and an opening end of the second side wall via the first side wall, the top wall and the second side wall.

4. The pressure sensor according to claim 1, wherein:
the side walls include a first side wall and a second side wall;
the front wall has a middle portion between the first side wall and the second side wall;
the front wall has an exterior wall surface; and
the middle portion protrudes from the side walls and the exterior wall surface is angled.

5. The pressure sensor according to claim 1, wherein:
the side walls include a first side wall and a second side wall;
the top wall has a first planar section adjacent to the first side wall and a second planar section adjacent to the second side wall; and
the first planar section adjacent to the side wall is connected to the second planar section adjacent to the second side wall at an acute angle.

6. The pressure sensor according to claim 1, wherein:
the front wall has a visor adjacent to the opening end on an exterior wall surface of the front wall; and
the exterior wall surface protrudes and provides the visor.

7. The pressure sensor according to claim 1, wherein:
a term "lower" indicates a direction of gravity;
a term "upper" indicates a direction opposite to the direction indicated by the term "lower"; and
a term "forward" indicates a direction perpendicular to the direction indicated by the term "lower" and toward a side on which the inlet port is located in the case.

* * * * *